United States Patent
Kotas

(10) Patent No.: US 9,390,181 B1
(45) Date of Patent: Jul. 12, 2016

(54) PERSONALIZED LANDING PAGES

(75) Inventor: Paul Kotas, Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 155 days.

(21) Appl. No.: 13/157,248

(22) Filed: Jun. 9, 2011

(51) Int. Cl.
*G06F 3/048* (2013.01)
*G06F 17/30* (2006.01)

(52) U.S. Cl.
CPC .... *G06F 17/30867* (2013.01); *G06F 17/30873* (2013.01)

(58) Field of Classification Search
None
See application file for complete search history.

(56) References Cited

U.S. PATENT DOCUMENTS

| | | | |
|---|---|---|---|
| 7,281,042 B2 | 10/2007 | Hsu et al. | |
| 7,523,087 B1 | 4/2009 | Agarwal et al. | |
| 2005/0038894 A1 | 2/2005 | Hsu et al. | |
| 2005/0050027 A1 | 3/2005 | Yeh et al. | |
| 2005/0050097 A1 | 3/2005 | Yeh et al. | |
| 2005/0065806 A1 | 3/2005 | Harik | |
| 2005/0222901 A1 | 10/2005 | Agarwal et al. | |
| 2007/0061199 A1* | 3/2007 | Montgomery | G06Q 30/0255 705/14.53 |
| 2007/0100688 A1* | 5/2007 | Book | G06Q 30/02 705/14.52 |
| 2007/0239524 A1 | 10/2007 | Tewahade | |
| 2007/0271392 A1 | 11/2007 | Khopkar | |
| 2007/0271501 A1 | 11/2007 | Vasilik | |
| 2007/0271511 A1 | 11/2007 | Khopkar et al. | |
| 2008/0040175 A1* | 2/2008 | Dellovo | G06Q 10/0637 705/7.36 |
| 2008/0201220 A1 | 8/2008 | Broder et al. | |
| 2008/0221987 A1* | 9/2008 | Sundaresan | G06Q 30/02 705/14.54 |
| 2008/0248788 A1* | 10/2008 | Smith | H04M 3/4878 455/414.3 |
| 2008/0249853 A1* | 10/2008 | Dekel | G06Q 30/00 705/14.48 |
| 2009/0254564 A1* | 10/2009 | Nugent | G06Q 30/02 719/328 |
| 2010/0005001 A1* | 1/2010 | Aizen | G06Q 30/0277 705/14.73 |
| 2010/0042635 A1 | 2/2010 | Venkataramanujam | |
| 2010/0198772 A1* | 8/2010 | Silverman | G06Q 30/02 706/52 |
| 2010/0205057 A1* | 8/2010 | Hook | G06Q 30/0254 705/14.52 |
| 2011/0066497 A1* | 3/2011 | Gopinath | G06Q 30/02 705/14.53 |
| 2011/0173198 A1* | 7/2011 | Malleshaiah | G06F 17/30867 707/737 |
| 2011/0218862 A1* | 9/2011 | Langston | G06Q 30/02 705/14.69 |
| 2011/0264736 A1* | 10/2011 | Zuckerberg | G06Q 30/02 709/204 |
| 2012/0059713 A1* | 3/2012 | Galas | G06Q 30/0244 705/14.49 |

* cited by examiner

*Primary Examiner* — Hua Lu
(74) *Attorney, Agent, or Firm* — Hogan Lovells US LLP

(57) ABSTRACT

Personalized landing pages may be generated for users based at least in part upon information known about the individual users who are viewing the landing pages. Such information may include, for example, the consumer segments to which the individual user belongs, the individual users' browsing and purchasing histories, personal preferences and attributes. The landing pages are personalized to include, for example, content that may be of particular interest to the user and arranged in a manner that may appeal to the user.

21 Claims, 7 Drawing Sheets

PERSONALIZED LANDING PAGES

BACKGROUND

Advertisers and other such entities spend a significant amount of resources to provide online advertisements and other supplemental content to specific users. Textual advertising, which is a commonly used type of online advertising, includes the practice of placing "sponsored links" on search result pages provided by web search engines. The sponsored links placed on a page are often based on search query terms provided by the user. Display advertising is another commonly used type of online advertising. There are numerous ways in which digital display advertising is used. For example, display advertising may include placing a digital advertisement on one or more web pages, where the subject matter of the advertisement is relevant to at least some portion of the content currently presented on the web page. Retargeting display advertising is yet another type of digital display advertising where, for example, a user is presented with a graphical or rich media advertisement based on the user's browsing and/or purchasing history. For example, if, when browsing an online retailer web site, a user navigates to a detail web page for a particular item but does not actually purchase the item, the user may later be presented with an advertisement for that same item. Other types of digital display advertising include brand-oriented and performance advertising which are targeted to users with a particular set of demographics or behavioral characteristics that make showing an advertisement to a user desirable.

Oftentimes sponsored links and display advertisements, regardless of whether they are placed via textual, contextual, targeted, or other types of advertising techniques, include graphic or rich media and text describing the product or service being advertised. Further, in some cases, sponsored links and display advertisements may include hyperlinks to a webpage, mobile site and the like, where the user may purchase the product and/or obtain more information about the advertised products or services. The web pages that the user is navigated to in response to interacting with the sponsored link or display advertisement is commonly referred to as a "landing page." For example, if a display advertisement is provided for a product, the landing page the user is directed to may be sponsored by the product manufacturer or brand, merchant, vendor, an online retailer, etc. where the user can purchase or obtain more information about the product. If the user purchases the product as a result of interacting with the display advertisement, the display advertisement is said to have resulted in a "conversion." Thus, personalizing a landing page may be able to influence conversion rates positively.

BRIEF DESCRIPTION OF THE DRAWINGS

Various embodiments in accordance with the present disclosure will be described with reference to the drawings, in which.

Same numbers are used throughout the disclosure and figures to reference like components and features, but such repetition of number is for purposes of simplicity of explanation and understanding, and should not be viewed as a limitation on the various embodiments.

DETAILED DESCRIPTION

Figure 1:
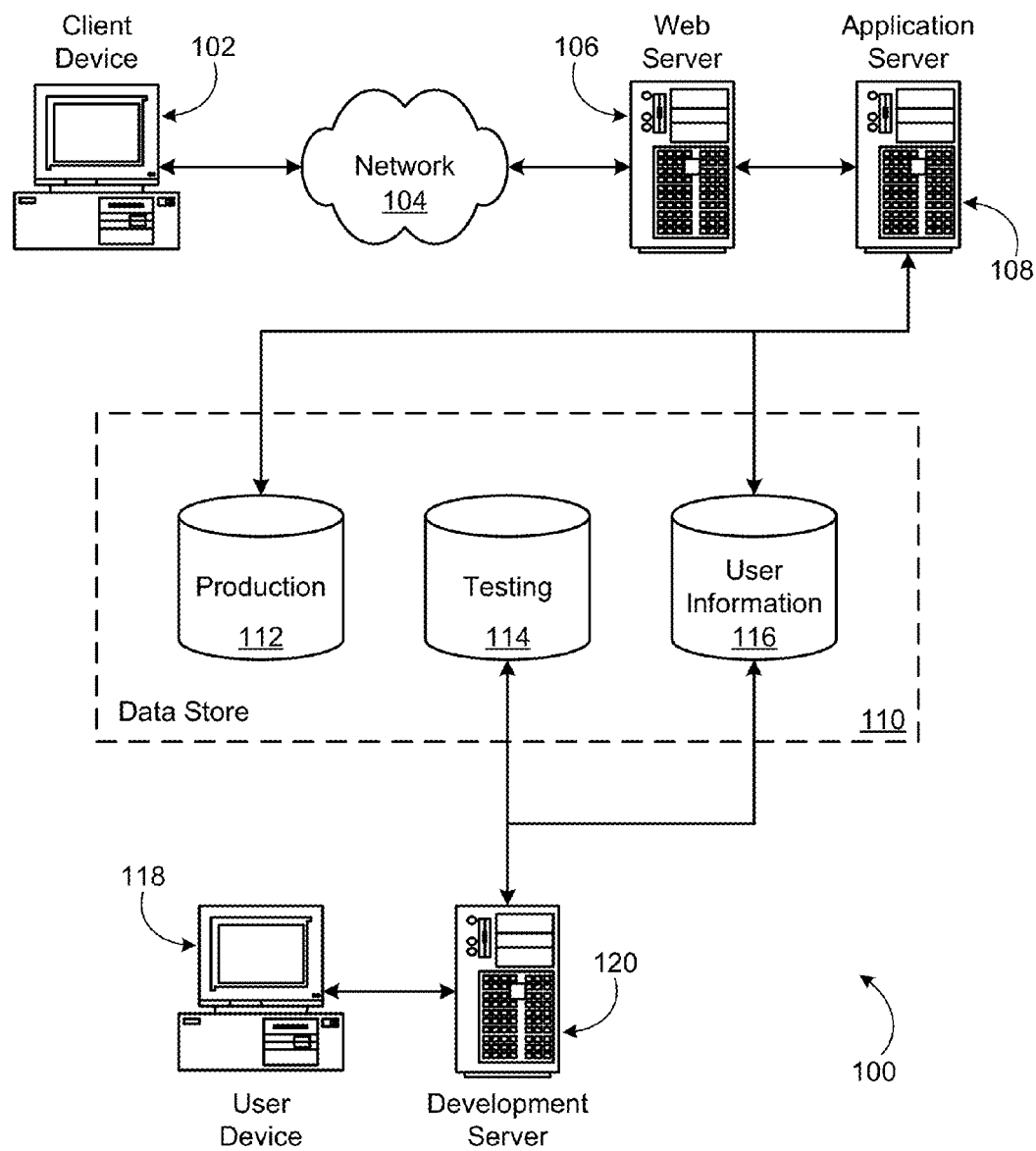
FIG. 1 is a schematic diagram illustrating an example environment for implementing aspects, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details, and that variations and other aspects not explicitly disclosed herein are contemplated within the scope of the various embodiments. Furthermore, well-known features may be omitted or simplified in order not to obscure the embodiment being described.

Various embodiments are described herein for generating a personalized landing page based on a combination of information known about the individual user viewing the landing page and the entity sponsoring the landing page. Information known about a user may include, but is not limited to, online (mobile, web, etc.) browsing history, purchasing history (online and offline), personal preferences, interests, attributes, social graphs and other demographic data. Personalizing a landing page may include, for example, identifying and displaying content in the landing page that may be of particular interest to the user.

It will be helpful to have a brief example of generating a personalized landing page. In one example, a user interacts with a display advertisement presented on a web page that features a particular product (e.g., Acme's newly released L57 laptop computer) or brand (e.g., Acme's newest family of laptop computers). Upon interacting with the display advertisement, the user is navigated to a landing page that displays, among other things (or by itself), Acme's L57 laptop computer. Information known about the user (e.g., online browsing history, purchasing history, social graph, preferences, etc.) and the entity associated with the display advertisement (Acme) may be used to personalize the landing page that the user is navigated to. Based on this information, products that are likely of interest to the user (and appropriate for the advertiser) are identified and displayed in a personalized landing page.

If, for example, the display advertisement is sponsored by Acme (or an entity on behalf of Acme), the landing page the user is navigated to may contain only Acme brand imagery, products or services. For example, the landing page may contain brand imagery provided by Acme related to the specific Acme product displayed in the display advertisement (L57 laptop computer) and/or any other number of Acme products (e.g., top-selling Acme products, Acme products related to digital SLRs, promotional Acme products, etc.). The Acme products contained in the landing page may be influenced by information known about the user that previously interacted with the display ad. For example, the top-selling Acme products contained in the landing page may be within a certain price point that, based on the user information, is inferred the user is most likely to purchase an Acme product. As another example, it may be possible to determine, based on the user information, that the user recently purchased an Acme television. Thus, Acme products that compliment a television (e.g., Acme remote control, Acme wall mount, etc.) may be selected for display in the landing page even though these products are not directly related to the L57 laptop featured in the display ad.

In another instance, if the display advertisement is sponsored by, for example, an online retailer (e.g., "Electronic Warehouse") that sells Acme brand products among other brands, the "Electronics Warehouse" landing page the user is navigated to may contain the Acme product featured in the display advertisement as well as products offered by "Electronics Warehouse" associated with brands other than Acme (including competitors of Acme). Again, any information known about the user or community of "similar" users may be used to determine products for display in the landing page that may be of interest to the user.

FIG. 1 illustrates an example of an environment 100 for implementing aspects in accordance with various embodiments. As will be appreciated, although a Web-based environment may be utilized for purposes of explanation, different environments may be utilized, as appropriate, to implement various embodiments (e.g., mobile web pages, mobile applications, etc.). The environment 100 shown includes both a testing or a development portion (or side) and a production portion. The production portion includes an electronic client device 102, which may include any appropriate device operable to send and receive requests, messages, or information over an appropriate network 104 and convey information back to a user of the device 102. Examples of such client devices include personal computers, cell phones, handheld messaging devices, laptop computers, set-top boxes, personal data assistants, electronic book readers, and the like.

The network 104 may include any appropriate network, including an intranet, the Internet, a cellular network, a local area network, a wide area network, a wireless data network, or any other such network or combination thereof. Components utilized for such a system may depend at least in part upon the type of network and/or environment selected. Protocols and components for communicating via such a network are well known and will not be discussed herein in detail. Communication over the network may be enabled by wired or wireless connections, and combinations thereof. In this example, the network 104 includes the Internet, as the environment includes a Web server 106 for receiving requests and serving content in response thereto, although for other networks an alternative device serving a similar purpose could be utilized as would be apparent to one of ordinary skill in the art.

The illustrative environment 100 includes at least one application server 108 and a data store 110. It should be understood that there may be several application servers, layers, or other elements, processes, or components, which may be chained or otherwise configured, which may interact to perform tasks such as obtaining data from an appropriate data store. As used herein the term "data store" refers to any device or combination of devices capable of storing, accessing, and/or retrieving data, which may include any combination and number of data servers, databases, data storage devices, and data storage media, in any standard, distributed, or clustered environment.

The application server 108 may include any appropriate hardware and software for integrating with the data store as needed to execute aspects of one or more applications for the client device 102, and may even handle a majority of the data access and business logic for an application. The application server 108 provides access control services in cooperation with the data store 110, and is able to generate content such as text, graphics, audio, and/or video to be transferred to the user, which may be served to the user by the Web server 106 in the form of HTML, XML, or another appropriate structured language in this example.

The handling of all requests and responses, as well as the delivery of content between the client device 102 and the application server 108, may be handled by the Web server 106. It should be understood that the Web and application servers 106, 108 are not required and are merely example components, as structured code discussed herein may be executed on any appropriate device or host machine as discussed elsewhere herein. Further, the environment 100 may be architected in such a way that a test automation framework may be provided as a service to which a user or application may subscribe. A test automation framework may be provided as an implementation of any of the various testing patterns discussed herein, although various other implementations may be utilized as well, as discussed or suggested herein.

The environment 100 may also include a development and/or testing side, which includes a user device 118 allowing a user such as a developer, data administrator, or tester to access the system. The user device 118 may be any appropriate device or machine, such as is described above with respect to the client device 102. The environment 100 may also include a development server 120, which functions similar to the application server 108 but typically runs code during development and testing before the code is deployed and executed on the production side and becomes accessible to outside users, for example. In some embodiments, an application server may function as a development server, and separate production and testing storage may not be utilized.

The data store 110 may include several separate data tables, databases, or other data storage mechanisms and media for storing data relating to a particular aspect. For example, the data store 110 illustrated includes mechanisms for storing production data 112 and user information 116, which may be utilized to serve content for the production side. The data store 110 also is shown to include a mechanism for storing testing data 114, which may be utilized with the user information for the testing side. It should be understood that there may be many other aspects that are stored in the data store 110, such as for page image information and access right information, which may be stored in any of the above listed mechanisms as appropriate or in additional mechanisms in the data store 110.

The data store 110 is operable, through logic associated therewith, to receive instructions from the application server 108 or development server 120, and obtain, update, or otherwise process data in response thereto. In one example, a user might submit a search request for a certain type of item. In this case, the data store 110 might access the user information 116 to verify the identity of the user, and may access the catalog detail information to obtain information about items of that type. The information then may be returned to the user, such as in a results listing on a Web page that the user is able to view via a browser on the user device 102. Information for a particular item of interest may be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment 100 in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the environment 100 in FIG. 1 should be taken as being illustrative in nature, and not limiting to the scope of the disclosure.

Figure 2:
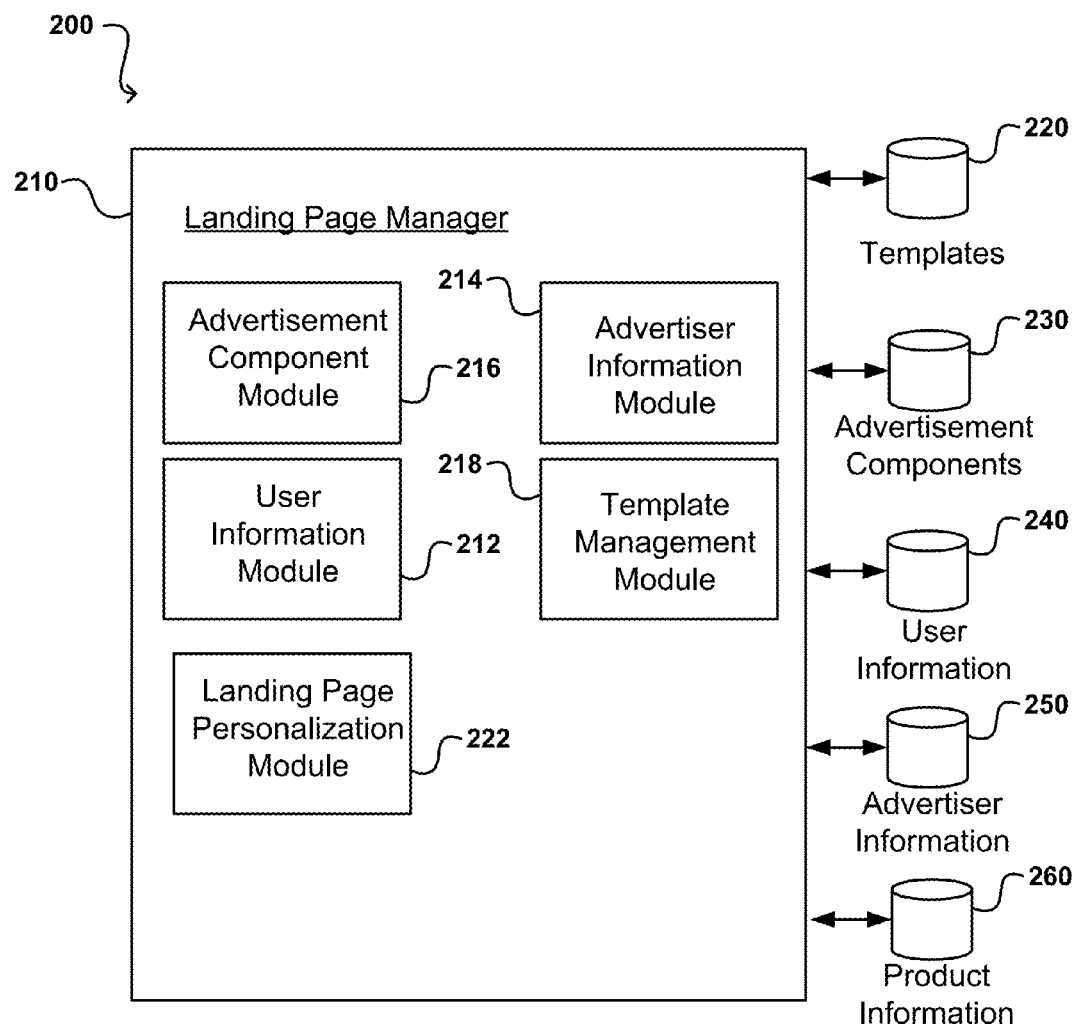
FIG. 2 is a block diagram depicting aspects of an example system, in accordance with at least one embodiment.

The environment 100 of FIG. 1 may include additional components and/or other arrangements, such as those illustrated in system 200 of FIG. 2. In this example, the system 200 includes a landing page manager 210 that responds to landing page requests that are generated when users interact with a display advertisement presented in electronic interfaces such as web sites, search engines, applications, etc. According to the illustrated embodiment, the landing page manager 210 includes a user information module 212, an advertiser information module 214, an advertisement component module 216, a template management module 218, and a landing page personalization module 222. The landing page manager 210 reads and/or writes data to a templates data store 220, an advertisement component data store 230, a user information data store 240, an advertiser information data store 250, and a product information data store 260. The data stores 220, 230, 240, 250, and 260 may, in some embodiments, be implemented as part of the landing page manager 210 while in other embodiments of the present invention, the data stores 220, 230, 240, 250, and 260 are implemented separately from the landing page manager 210. For discussion purposes only, the technology disclosed herein will be described in reference to users interacting with a display advertisement.

According to an embodiment, the user information module 212 obtains user information and optionally provides the obtained user information to the user information data store 240. User information may be obtained using various techniques. For example, user information may be obtained from a log or database of recorded online browsing history, purchasing history (online and offline), search history, demographic information, social graph (e.g., network of friends, relatives, work associates, etc.), selected advertisements and the like.

According to some embodiments, user information may be expressly provided by a user. For example, a web site may enable a user to create and manage a user profile that certain information. Such information and preferences may be incorporated into the user information data store 240. Information expressly provided by a user may include, for example, demographic information, such as age, gender, or income, location information (e.g., address), phone numbers, interests, memberships in social networks, favorite brands and the like. In an embodiment, the interface may include a user interface, such as web page, that allows user information to be manually entered by a user or by an operator. In an embodiment, the interface may comprise an electronic interface, such as an application programming interface, for electronically interfacing with the user information data store 240 from an executable program to add information to the user information data store 240 or access information stored in the user information data store 240.

According to some embodiments, an entity associated with a landing page (e.g., advertiser, brand, merchant, retailer, vendor, etc.) may provide information, such as brand imagery, logos and the like associated with the brand and/or advertising campaign that the advertiser would like to convey through a landing page. For example, an advertiser may provide information about its top-selling products, newest products, and products within a certain price range. Further, advertisers may provide information that indicates which of its products complement each other. Thus, when a product is featured in a display advertisement, products complimenting the featured product (whether of the same brand or not) can be presented on the landing page in addition to the product featured in the display advertisement. For example, if the display advertisement features a particular digital camera, the advertiser may wish for the landing page to present products that compliment the digital camera such as camera cases, batteries, external flashes, a "comparable" digital camera (of the same brand or a different brand) and the like.

An advertiser may be any entity sponsoring or associated with a display advertisement for itself or on behalf of another entity (e.g., brand, manufacturer, etc.). Information module 214 may provide an interface or API for an advertiser to provide information such as brand imagery, logos and the like to the advertiser information data stores 250, 260. In an embodiment, the interface may include a user interface, such as web page, that allows this information to be manually entered by an advertiser or by an operator. In an embodiment, the interface may comprise an electronic interface, such as an application programming interface, for electronically interfacing with the advertiser to add information to the advertiser and product information data stores 250, 260 or access information stored in the advertiser and product information data stores 250, 260. Product information store 260 may, in some embodiments, also contain product similarity data (e.g., users who viewed/purchased item A also viewed/purchased items B, C, D, etc.) whether the same or a different brand than item A.

The advertisement component module 216 obtains advertisement components and corresponding attribute information. Further, the advertisement component module 216 categorizes and stores the advertisement components and corresponding attribute information in the advertisement component data store 230. For example, the advertisement component module 216 may categorize advertisement components as being components that appeal to certain segments of users. Advertisement components and, thus, the advertisement component data store 230 may include advertising content such as brand imagery, logos, text, images, video content, animated content or games, rich media or any other type of advertising content. The advertisement component module 216 may obtain advertising components from third parties, such as advertisers, brands, manufacturers, etc. of products and services, and may contain "house" or stock content used to supplement or enhance advertising content provided by the advertisement provider.

According to an embodiment, advertisement components stored in the advertisement component data store 230 may be categorized based on the attributes of the individual advertisement components. These attributes may include, but are not limited to, the product type or service type for advertisement components that are directed to specific products or services, the predominant colors featured in the advertising components, the size of the advertisement components, and the media type of the advertisement component. These attributes may be used to select advertisement components for personalizing landing pages for users.

Figure 3A:
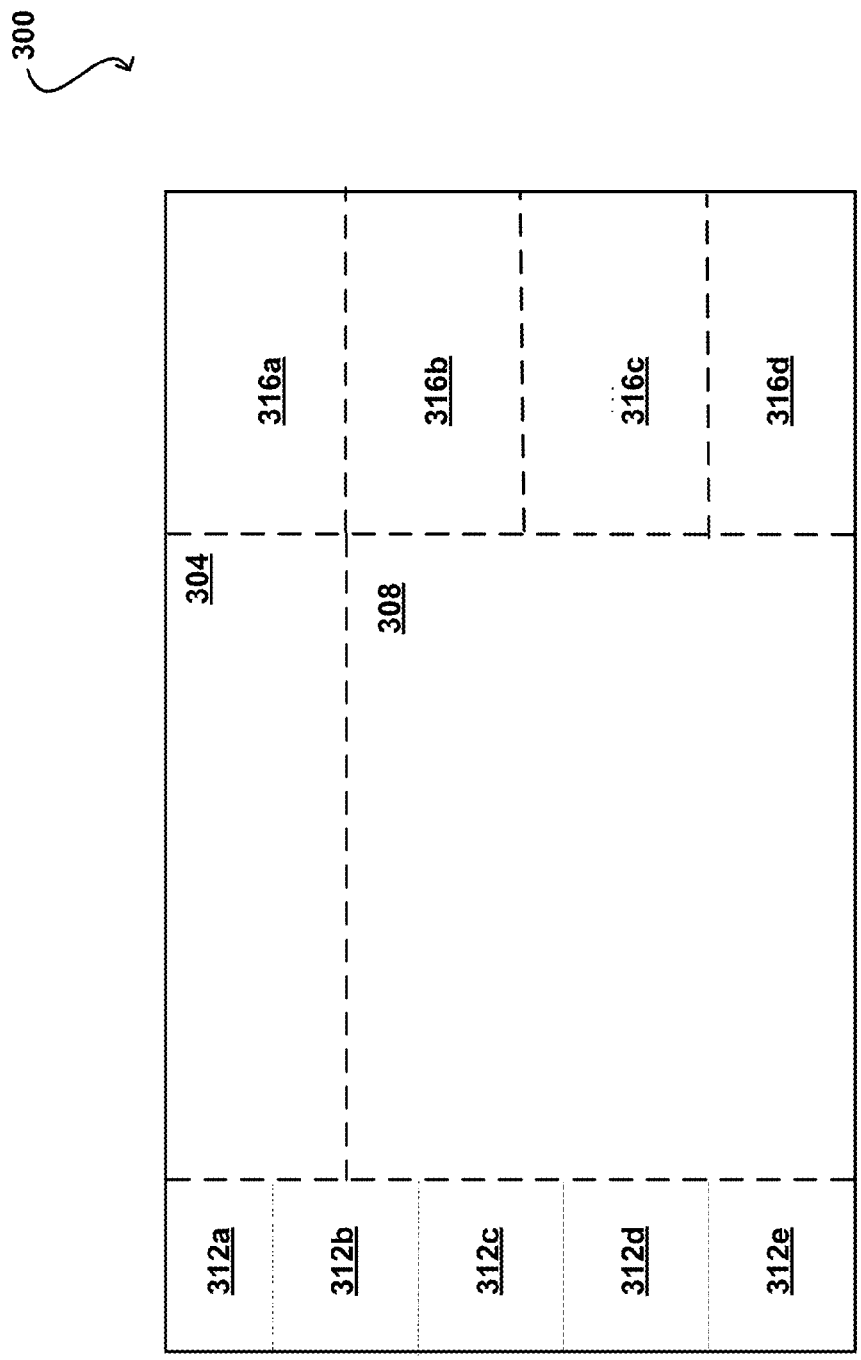
FIG. 3a is a schematic diagram illustrating an example landing page template, in accordance with at least one embodiment.

The template module 218 may generate and/or obtain a landing page template from another source used for personalizing landing pages and stores the landing page templates in the templates data store 220. According to an embodiment, a landing page template includes at least one placement that, upon rendering the landing page, shows or contains content (e.g., advertisement, search results, product listing, etc.) in the landing page. An example landing page template 300 is illustrated in FIG. 3a.

The landing page personalization module 222, according to one embodiment, is configured to personalize landing pages using advertisement creatives (e.g., images, videos, games, etc.) from advertisement components data store 230 (or other sources) based on any combination of information obtained from the user information data store 240, the advertiser data store 250 and product information data store 260, further in view of the selected display advertisement. For example, the landing page personalization module 222 processes a request for a landing page, such as from a web server requesting a landing page in response to a user interacting with a display advertisement. The landing page personalization module 222, among other things, obtains a landing page template from the templates data store 220, selects from the advertisement component data store 230 (or other source) advertisement creatives related to the product featured in the display advertisement, and associates each advertisement creative with a placement (shown in FIG. 3a) of the selected template. It should be appreciated that, in some embodiments, the advertisement creatives are selected and provided by the advertiser/brand associated with the landing page. For example, the landing page personalization module 222 may request advertisement tags from the ad server and associate each ad tag with a placement. When the landing page personalization module 222 is rendering a landing page, the advertisement tags are used to "call" an ad server to retrieve the creatives for display on the landing page.

Further, the landing page personalization module 222 may access user information (of the user that selected the display ad, if the user can be identified) and the advertiser's information (of advertiser(s) associated with the landing page), and select advertisement components based on any combination of the user, advertiser and product information. According to some embodiments, the landing page personalization module 222 accesses the user information in the user information data store 240 via the user information module 212. In other embodiments, the landing page personalization module 222 may access user information data store 240 directly to retrieve user information. Further, according to some embodiments, the landing page personalization module 222 may access the advertiser information in the advertiser information data store 250 via the advertiser information module 214, while in other embodiments, the landing page personalization module 222 may access advertiser information data store 250 directly to retrieve advertiser information.

According to an embodiment, the landing page personalization module 222 is further configured to optimize a landing page based on user responses to previously displayed landing pages. For example, to optimize a landing page, the landing page personalization module 222 may utilize a user's browsing and/or purchasing histories, such as by recording the advertisements that have been presented to the user and any responses to such advertisements. Such responses include, but are not limited to, whether the user purchased the products featured in a display ad, viewed a detail page about the product featured in the display ad, added the product featured in the display ad to an online shopping cart, read or provided consumer reviews about the product featured in the display ad or viewed/purchased products similar to the product featured in the display ad (whether of the same brand or not). The landing page personalization module 222 may also utilize user behavior information aggregated across a community of users. By aggregating user information across a plurality of users, the landing page personalization module 222 can learn how to best present advertisements in a landing page to optimize interaction with the advertisements.

With reference to FIG. 3a, the example landing page template 300 includes a brand information placement 304, a main or prominent placement 308, a first set of secondary placements 312a-e and a second set of secondary placements 316a-316d. It should be appreciated that the configuration of placements shown in FIG. 3a is exemplary only and is not intended to limit the scope of the technology described herein. As with any conventional web page, a landing page may also have a background that may have customizable color schemes, font sizes and styles, icons, graphics, etc. In an embodiment, the landing page personalization module 222 selects a background for the landing page based on attributes and preferences of a user, the advertiser or brand featured in the landing page some combination thereof. The template 300 may designate the type of content that may be shown in one or more of the placements. As one example, the template 300 may designate that the main placement 308 show an advertisement (or information) associated with the product or service featured in the display advertisement selected by a user. As another example, landing page template 300 may designate that one or more placements contain a static image, rich media, etc.

Using the example provided above whereby a landing page features items associated with a single brand (e.g., Acme), the template may designate that the secondary placements 312 show products and/or advertisements offered only by the same brand. For example, secondary placements 312 may show only Acme's products that are similar to, or that complement, the product(s) shown in placement 308 (e.g., Acme's top selling products, Acme's newest products, etc.). According to an embodiment, the advertiser sponsoring the landing page may specify the advertising content of placements 312. For example, instructions that indicate which advertisement components are directed to which products may be located in the advertiser and product information data stores 250, 260. However, it should be appreciated that the landing page personalization module 218 could select the advertising content for placements 312. Placements 316 may be populated with, among other things, advertisements that may be of interest to the user based on available user information. In an embodiment, the landing page personalization module 222 may access the user information data store 240 to determine which advertisements of the advertisement component data store 230 may appeal to the user or to a segment of users who have similar traits or behaviors. For example, the landing page personalization module 222 may identify the consumer segments to which the user belongs, and then access the advertisement component data store 230 to identify advertisements that may appeal to users of those consumer segments.

Figure 3B:
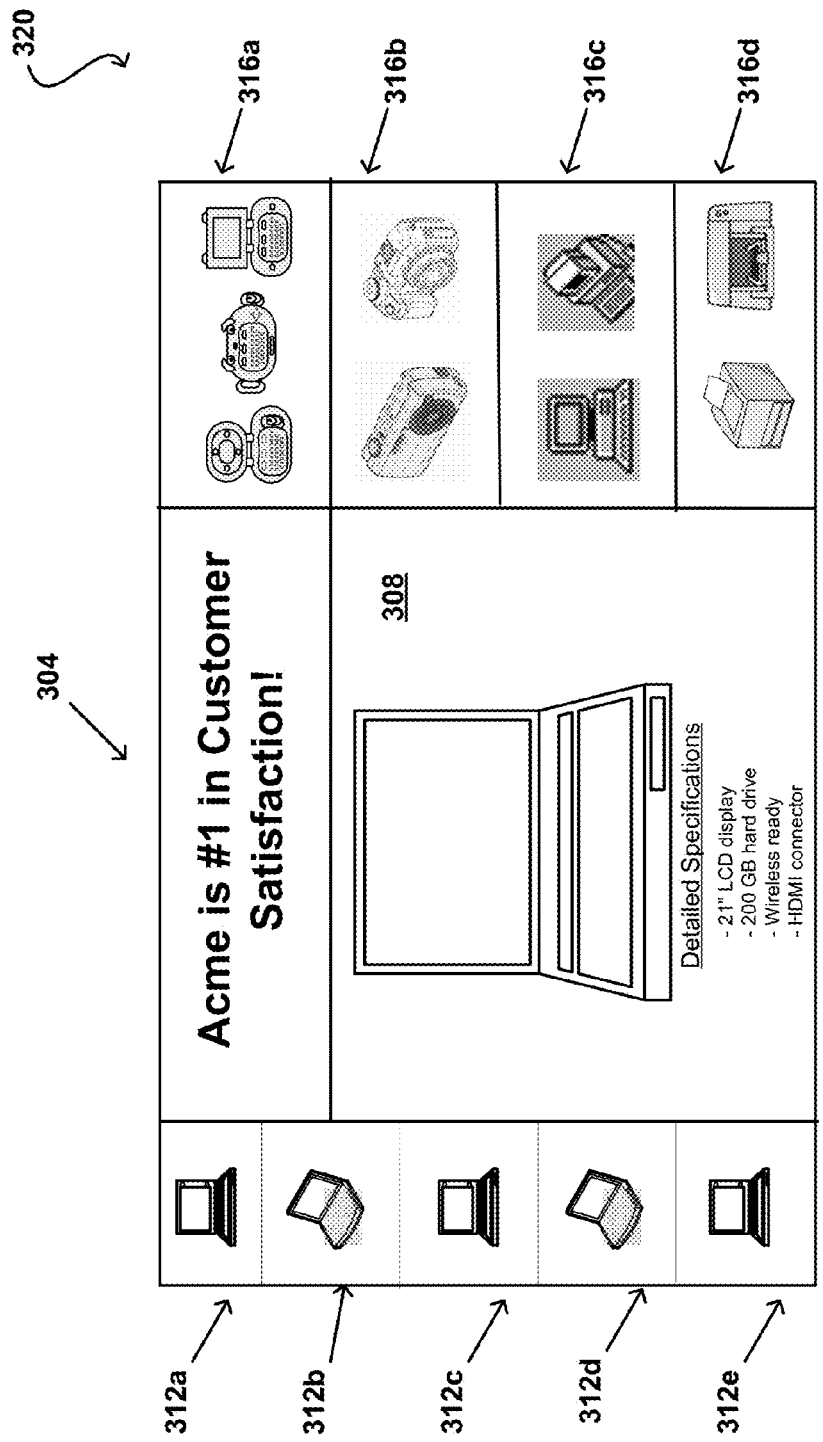
FIG. 3b is a schematic diagram illustrating an example landing page associated with a single brand.

Continuing with the Acme example provided above, FIG. 3b illustrates an example personalized landing page 320 that may be presented in response to a user interacting with a display advertisement featuring Acme's L57 laptop computer. The landing page illustrated in FIG. 3b is an example of a landing page sponsored by Acme itself or, for example, an online retailer on behalf of Acme. Either way, the landing page will contain content associated with a single brand of products—Acme's brand. Throughout this application, the terms "advertisement," "ad," "content," "creative" and the like may be used interchangeably to describe a piece of content, whether static, rich media, etc. In the FIG. 3b example, the placement 304 may contain Acme's brand and image information, logos and the like. The placement 308 shows an advertisement featuring the L57 laptop computer featured in the previously selected display advertisement. The placements 312a-e show various advertisements directed to other Acme brand laptops. For example, the Acme brand laptops shown in placements 312a-e may be Acme's top selling laptops, newly released laptops, laptops with configurations similar to the L57 shown in placement 308, laptops with a higher price point than the L57 (upsell opportunity) and the like. The laptops shown in placements 312 may be further refined by a price range that the user is likely to find acceptable based on data contained in the user information store 240 (or other sources). Placements 312a-e may also contain content other than laptops and are not required to each contain the same type of content.

The placements 316a-d shown in FIG. 3b, in this example, show advertisements of other Acme items. For example, the products shown in the placements 316 of FIG. 3b include Acme toy computers (316a), Acme digital cameras (316b), Acme desktop computers (316c), and Acme printers (316d). Each of the items shown in one of the placements 316 may be selected for the landing page, in part, based on information known about the user. For example, the toy computer shown in placement 316a may have been selected based in part on the user's purchase history indicating that the user has recently purchased a children's toy. The digital camera shown in placement 316b may have been selected based in part on the user's browsing history indicating that the user recently viewed a digital camera online. The desktop computer shown in placement 316c and the printer shown in placement 316d may have been selected based on knowledge that consumers categorized in a consumer segment similar to the user (e.g., small business owner) often buy desktop computers and printers at the same time. Other types of information may be used to personalize the displayed items. For example, attributes of the item that was featured in the display advertisement may be used to identify items for display in a landing page.

Figure 3C:
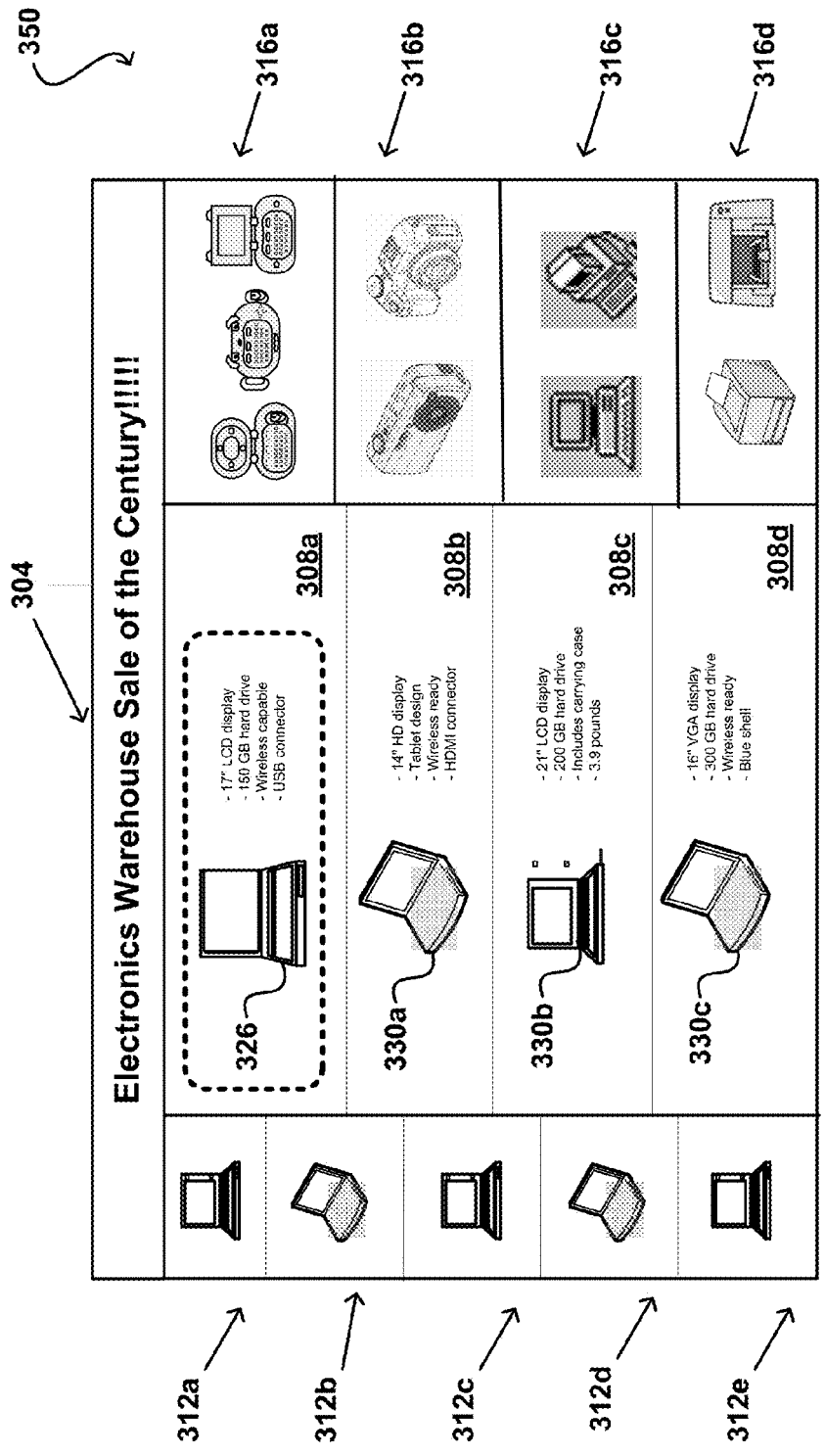
FIG. 3c is a schematic diagram illustrating an example landing page associated with an online retailer.

FIG. 3c illustrates an example landing page 350 sponsored by an online retailer ("Electronics Warehouse") to promote items offered by "Electronics Warehouse". In this example, the online retailer may chose to show products associated with a single brand or multiple brands. The landing page 350 in FIG. 3c also contains multiple placements 308a-308d. In one example, the item 326 that was featured in the display advertisement may be presented in a first placement 308a (e.g., "Electronics Warehouse display ad featuring a particular laptop computer). Some or all of the items presented in the placements in landing page 350 may be identified based in part on the query terms entered by the user that triggered display of the display advertisement in the first place. For example, the query terms entered by the user that caused the display of the "Electronics Warehouse" display advertisement on the search page may be used identify items contained in the retailer's inventory for display in the landing page 350. In the example shown in FIG. 3c, the landing page 350 is configured to contain the Acme L57 laptop featured in the display advertisement in placement 308a, similar laptops of the same brand in placements 308b-d, similar laptops of other brands in placements 312a-e and related items in placements 316a-d. While this configuration of landing page 350 is shown in FIG. 3c, other configurations are within the scope of the technology described herein.

As illustrated in FIG. 3c, laptop 326 (Acme L57 laptop) may be highlighted to distinguish it from the other items shown in placements 308b-d. Such highlighting may include enclosing the item in a box or using bold, large or uniquely colored font, etc. As discussed above, the items shown in placements 308b-d, 312 and 316 may be identified based in part on user information, community information, attributes associated with the Acme L57 laptop computer or any combination thereof. As such, in addition to displaying items selected based on the user's information (placements 316), items designated by the advertiser (placements 312), and the item that was featured in the display advertisement (placement 308a), the landing page 350 shown in FIG. 3c also shows search-result items (computers 330a-c). It should be appreciated that, in some embodiments, the search-result items shown in placements 308b-d contain only items associated with a single brand. In other embodiments the placements 308b-308d may contain items associated with different brands.

It should be appreciated that the landing page template 300 shown in FIG. 3a is merely an example and that a landing page template (or the page itself) may have any number of placements and configurations. For example, if user information is not available, then the landing page template may only include one set of placements for showing advertisement creatives directed to the item featured in the display advertisement and another set of placements for advertisement creatives selected by the advertiser and are similar to the item featured in the display advertisement (e.g., recommend items that the community is purchasing or viewing, recommend items that users who selected the display ad (or purchased the item featured in the display ad) also purchased/viewed, etc.), within a certain price range and the like. Further for example, if the advertiser has not provided enough advertising creatives for items that it would like to promote, the landing page template may only include one set of placements for advertisement creatives directed to the subject matter of a display advertisement.

Figure 4:
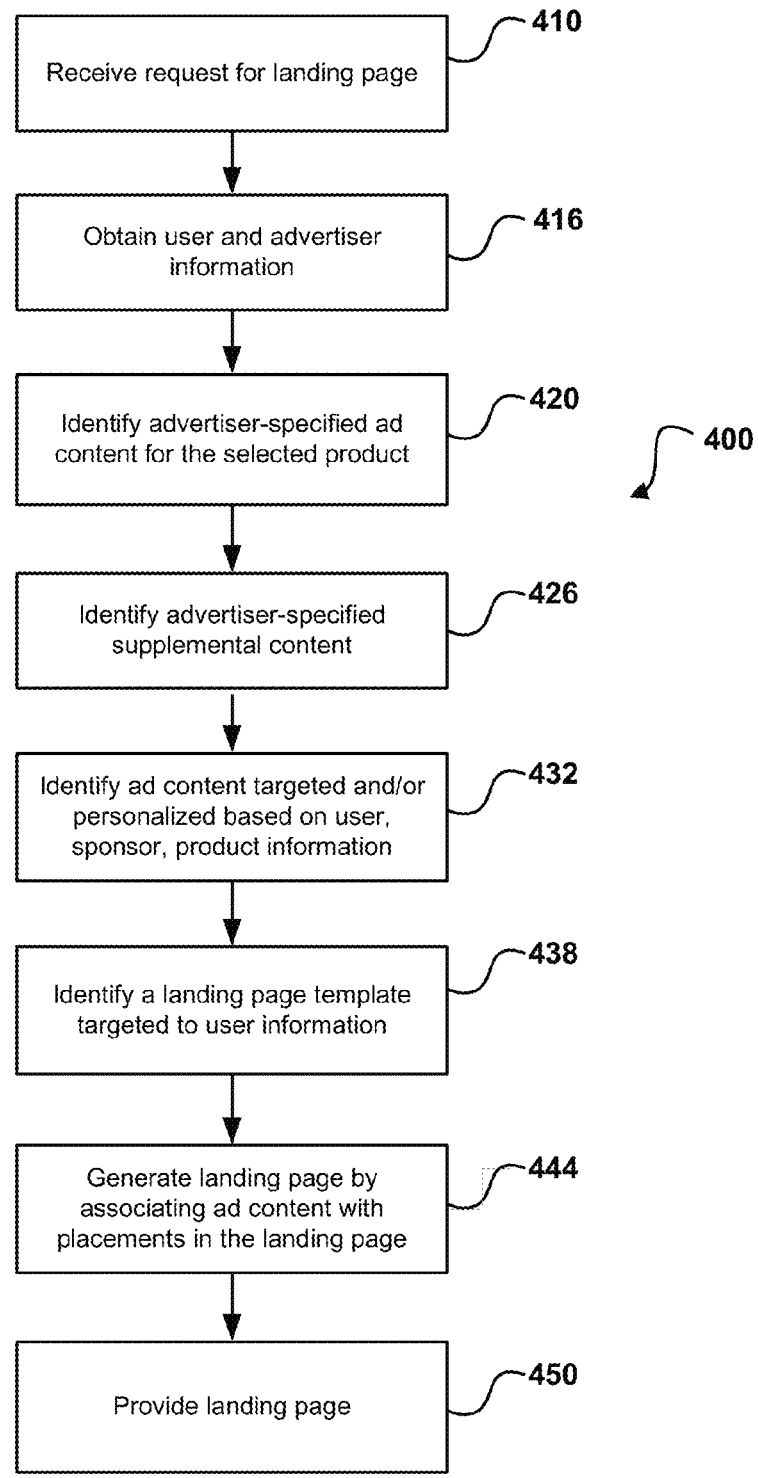
FIG. 4 provides a flow diagram illustrating an example process whereby the example system of FIG. 2 is used for generating personalized landing pages, in accordance with at least one embodiment.

FIG. 4 illustrates an example process 400 for generating a personalized landing page in accordance with one embodiment. As indicated at block 410, a request for a landing page is received. For example, a request to view a landing page may be received in response to a user interacting with an element of a display advertisement. The request may include, for example, identification of the product featured in the display ad, user ID, domain the user was navigated from, etc. provided in a referrer URL.

At 416, any user information associated with the user that interacted with the display ad and information associated with the advertiser associated with the landing page is obtained. In an embodiment, each user, display ad and advertiser may be associated with a unique identifier. In this instance, information related to the user that selected the display advertisement and the advertiser that sponsored the display advertisement may be located and obtained using these unique identifiers. It should be appreciated that users may also be identified by using various methods, such as using the Internet Protocol (IP) address of the user's computer system or via a login identifier that the user has used to access content on a content provider's website, an HTTP cookie or other means. Further, it should be appreciated that advertisers may also be identified by using various other methods, such as using the hyperlink of the sponsored link or advertisement that was selected by the user to request a landing page.

User information may also be obtained from third parties, such as social networks, microblogging sites and the like, that can provide additional information about the user as well as information about others that are connected to the user in some manner (e.g., friends of a user, users in the same community, etc.). For example, social networks may provide information about brands and products that are of interest to the user or the user's friends. If the user or the user's friends self-identity with or express an interest in a particular brand or product, then a landing page may be personalized with advertising content for that brand or product. The landing page may be personalized with advertising content for products that the user's friends have purchased or products for which the user's friends have written favorable reviews. For example, if five of the user's friends have purchased a particular product, then a landing page may be personalized with information about that product and an indication that five of the user's friends have purchased that product. The landing page may include the names of the user's friends that have purchased the product and comments those friends have made about the product.

It should also be appreciated that, if the user information data store 240 does not contain any specific behavior or demographic information associated with a particular user, information associated with other users having similar attributes or behaviors could be used to select content for display on the landing page. For example, the user information of users located in the same or similar geographic location as the current user may be used. In this case, an IP address, GPS location information and the like may be used to determine a geographic location of the current user. Demographic information (e.g., age, income, gender, etc.) may inferred of the current user by identifying browsing habits or behavioral information based on search habits or patterns, products reviewed and the like that the current user may have in common with others. It is also within the scope of the technology described herein to select content for display on the landing page based on information provided by the advertiser sponsoring the landing page (or another entity) without any knowledge of user information. For example, the advertiser may designate one or more default advertisements to be presented in all landing pages it sponsors.

At 420, content designated by the advertiser to promote the product or service featured in the display advertisement (or other source document) is identified. In some instances, the landing page personalization module 222 obtains the content from the advertisement components data store 230 for display in the landing page based on the display advertisement selected by the user. In other instances, the landing page personalization module 222 receives the content from the advertiser.

At block 426, supplemental advertising content is identified for display in the landing page. Supplemental advertising content may be any content promoting a product or service other than the item featured in the display advertisement initially selected by the user. Continuing with the example provided in FIG. 3b, supplemental advertising content shown in the landing page 320 includes the advertiser's most popular products or services, products or services that are within a certain price range, newly released products or services, products or services that complement or are related to the "primary" product(s) shown on the landing page or products or services that are most relevant to the user (contained in placements 312, 316). According to an embodiment, the advertiser associated with the landing page 320 designates the supplemental advertising content that is to be presented on the landing page along with the creative to promote the product that was featured in display advertisement. It should be appreciated, however, that the landing page manager 210 could designate the supplemental advertising content on behalf of the advertiser (e.g., retailer on behalf of the brand). Further, it should be appreciated that the step indicated at block 426 is optional and that supplemental advertising content may not be shown at all on the landing page.

As discussed above, a landing page may show content based on information known about the user that selected the display advertisement (or information known about "similar" users). In this instance, at block 432, the landing page personalization manager 222 may utilize information contained in any combination of the user information data store 240, the advertisement components data store 230 and the product information store 260 to identify content that may be of interest to the user and/or any segments to which the user belongs (e.g., new parent, early adopter, etc.).

As indicated at block 438, a landing page template is selected (e.g., landing page template 300 shown in FIG. 3a). Features of the landing page template (e.g., background, font size, etc.) may also be personalized for the user. For example, using information known about the user, the color of the background of a landing page, font sizes and styles and the like may be customized to appeal to the user. In some instances, selecting a landing page template may occur after the advertising content has been identified, at block 420. This way, the number of placements in the landing page is known prior to identifying advertising content available to show in the landing page.

At block 444, the landing page is generated by associating a creative with each of the placements of the selected landing page template. In some cases, advertising content is ranked or weighted and the top ranked content is associated with each placement accordingly. For example, advertising content directly related to the product featured in the selected display advertisement may be rendered in a first placement of the template (e.g., placement 308 in FIG. 3a). Advertising content directed to products or services offered by the advertiser/ brand that are related to the product displayed in placement 308 may be rendered in a second set of placements of the template (e.g., placements 312 shown in FIG. 3a). As discussed above, the content may be directed to, by way of example only: (1) products offered by the advertiser or brand (these terms are used interchangeable throughout) that are similar, or complementary to, the "primary" product shown in the landing page; (2) the advertiser's top selling products; (3) the advertiser's newest products; and/or (4) products offered by the advertiser that are within a particular price range. In some embodiments, content selected based in part on information known about the user may be rendered in a third set of placements of the template (e.g., placements 316 in FIG. 3a). A set of placements is not limited to any certain type of content. For example, placements 316 may contain a combination of different types of advertising based on items attributes and user information. According to an embodiment, the advertising content rendered in the various placements in the landing page may be rank-ordered based on relevance to the item that was featured in the sponsored link or display advertisement, based on relevance to user information known about the user, etc. Further, for example, if the landing page template cannot accommodate all of the relevant advertising content (e.g., ten creatives for the landing page were identified, but the landing page template contains only three placements), then the landing page personalization manager 222 may select which advertisements to show in the landing page based on the ranked order.

Also for example, the advertiser sponsoring the landing page (for itself or on behalf of a brand) may select the creative to show in the landing page in real-time (or near real-time). For example, in the instance whereby an advertisement tag has been associated with a placement in the landing page, the personalization module 222 may make a "call" to an ad server (based on the ad tag) to retrieve to the actual advertisement content for display on the landing page. The response provided by the ad server to the call from the personalization module may be based on user information (e.g., IP address, purchase history, browsing history, etc.), contextual information (e.g., type of page display ad was shown) and the like. At 450, the personalized landing page is provided for display to the user.

Figure 5:
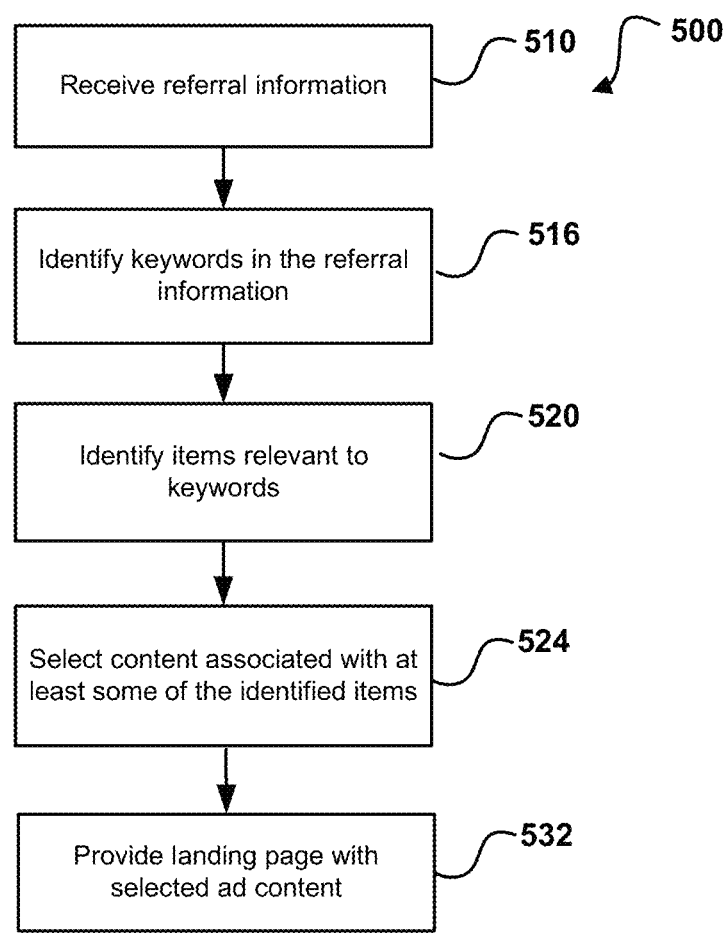
FIG. 5 provides a flow diagram illustrating another example process whereby the example system of FIG. 2 is used for generating personalized landing pages, in accordance with at least one embodiment.

FIG. 5 illustrates a process 500 for personalizing a landing page sponsored by an entity (e.g., online retailer) that may provide items for sale from multiple, different vendors (i.e., brands). In this instance, the online retailer may sponsor a text or display advertisement presented on a search result page provided by a search engine (in response to a user's query search, keyword, etc.). Targeting advertisements is well known within the online advertising industry and therefore does not require further disclosure herein. The process described in FIG. 5 is directed to personalizing a landing page, provided by the online retailer, that the user will be navigated to upon interacting with the search keyword advertisement.

At block 510, referral information is received. The referral information may be received in any number of ways. Continuing with the "Electronics Warehouse" advertisement example provided in FIG. 3c, referral information may be received from the search engine in response to the user interacting with the "Electronics Warehouse" display advertisement. In one embodiment, the search engine may provide the landing page manager 210 with a referrer URL.

At block 516, the query string in the referrer URL is parsed to obtain, among other things, the query text provided by the user. In some instances, identifying query text in the referrer URL string may include identifying a domain of the search engine that passed the referrer URL and applying a set of extraction rules applicable to the domain to identify the query text. At block 520, items provided by the online retailer that are relevant to these query text are identified. For example, the online retailer may use the query text to identify items contained in its inventory or catalog (brick and mortar or online) that are relevant to the keywords.

At block 524, advertising content associated with at least some of the identified items (block 520) is determined. Using the example template 300 shown in FIG. 3a, suppose the "Electronics Warehouse" display advertisement that the user interacted with featured a certain brand of laptop computer sold by "Electronics Warehouse" (based on the user's query "laptop computer"). According to an embodiment, advertising content associated with the laptop computer featured in the display advertisement may be shown in placement 308. As discussed above, additional items provided by the online retailer (that are relevant to the query text "laptop computer") are identified (block 520). Because the template 300 shown in FIG. 3a includes nine additional placements, the online retailer may select up to nine additional pieces of content for display in the landing page. These nine additional piece of content may include, for example, creatives such as advertising (e.g., advertisement featuring 20% off another brand of laptop computers offered by the online retailer), item placements of laptop computers (e.g., more/less expensive laptop computers offered by the same or different brand), item placements of related products/services (e.g., laptop bags, laptop batteries) or any combination thereof. As discussed above, the content provided in the landing page may be associated with the brand featured in the display advertisement, a combination of different brands, a single brand different than the brand featured in the display advertisement and the like In some embodiments, content selected for the landing page is based in part on information known about the user. This could be accomplished according to one or more of the examples provided above with reference to block 432 of FIG. 4. For example, the landing page personalization manager 222 may access the user's information in the data store 240 (e.g., preferred brands, viewing history, purchase history, segments associated with, etc.) and select or filter the relevant items (block 520) based on this user information. Again continuing with the example template shown in FIG. 3a, the online retailer, based on the user information, may select content for display in the landing page for items that were not initially ranked in the top nine items (e.g., initially ranked without user information). By way of example only, suppose the user information indicates that the user prefers a certain brand of laptop computer that is different than the brand featured in the display advertisement and the initial ranking of laptop computers for display in the landing page did not include a laptop computer of the user's preferred brand. In this case, the online retailer may select content (e.g., advertisement, item information, etc.) associated with one or more laptops of the user's preferred brand for display in the landing page. At block 532, the web page associated with the selected search result is personalized with relevant advertising content and presented to the user.

The various embodiments described herein may be implemented in a wide variety of operating environments, which in some cases may include one or more user computers, computing devices, or processing devices which may be utilized to operate any of a number of applications. User or client devices may include any of a number of general purpose personal computers, such as desktop or laptop computers running a standard operating system, as well as cellular, wireless, and handheld devices running mobile software and capable of supporting a number of networking and messaging protocols. Such a system also may include a number of workstations running any of a variety of commercially-available operating systems and other known applications for purposes such as development and database management. These devices also may include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. Such a network may include, for example, a local area network, a wide-area network, a virtual private network, the Internet, an intranet, an extranet, a public switched telephone network, an infrared network, a wireless network, and any combination thereof. The network may, furthermore, incorporate any suitable network topology. Examples of suitable network topologies include, but are not limited to, simple point-to-point, star topology, self organizing peer-to-peer topologies, and combinations thereof.

In embodiments utilizing a Web server, the Web server may run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®. The web server may also comprise one or more physical computing systems and/or comprise a "cloud computing" service having one or more virtual machines that are hosted on one or more physical computing systems.

The environment may include a variety of data stores and other memory and storage media as discussed above. These may reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device may include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also may include a computer-readable storage media reader, a communications device (e.g., a modem, a network card (wireless or wired), an infrared communication device, etc.), and working memory as described above. The computer-readable storage media reader may be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules including program modules, services, or other elements located within at least one working memory device, including an operating system and application programs, such as a client application or Web browser. It should be appreciated that alternate embodiments may have numerous variations from that described above. For example, customized hardware might also be utilized and/or particular elements might be implemented in hardware, software (including portable software, such as applets), or both. Further, connection to other computing devices such as network input/output devices may be employed.

Storage media and computer readable media for containing code, or portions of code, may include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which may be utilized to store the desired information and which may be accessed by the a system device. Program modules, program components and/or programmatic objects may include computer-readable and/or computer-executable instructions of and/or corresponding to any suitable computer programming language. In at least one embodiment, each computer-readable medium may be tangible. In at least one embodiment, each computer-readable medium may be non-transitory in time. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

The use of the terms "a" and "an" and "the" and similar referents in the context of describing embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope unless otherwise claimed. No language in the specification should be construed as indicating any non-claimed element as essential to the practice of at least one embodiment.

Preferred embodiments are described herein, including the best mode known to the inventors. Variations of those preferred embodiments may become apparent to those of ordinary skill in the art upon reading the foregoing description. The inventors expect skilled artisans to employ such variations as appropriate, and the inventors intend for embodiments to be constructed otherwise than as specifically described herein. Accordingly, suitable embodiments include all modifications and equivalents of the subject matter recited in the claims appended hereto as permitted by applicable law. Moreover, any combination of the above-described elements in all possible variations thereof is contemplated as being incorporated into some suitable embodiment unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:
1. A method of generating a single personalized landing page, the method comprising:
under the control of one or more computer systems configured with executable instructions,
receiving a request to access content related to an item associated with a display advertisement sponsored by an entity, the request generated in response to an interaction by a user with the display advertisement;

obtaining designated advertising content that is related to the item associated with the display advertisement;

obtaining supplemental advertising content related to one or more items that are complementary to the item associated with the display advertisement, the supplemental advertising content being offered by the entity and being related to at least a first item different from at least a second item advertised by the designated advertising content;

identifying one or more attributes associated with the user that interacted with the display advertisement;

obtaining recommended advertising content related to items that are associated with at least one of the identified one or more user attributes, the recommended advertising content being related to at least a third item that is different from the at least the second item advertised by the designated advertising content and different from the at least the first item related to the supplemental advertising content, the recommended advertising content including information of interest to other users connected to the user via a third party social network; and generating the single landing page by:
selecting an advertisement template for a web page to generate the single landing page based at least in part upon at least one of the user attributes and the entity that sponsored the display advertisement, the advertisement template containing a plurality of placements, wherein each placement is populated with at least one advertisement;

determining a ranking order for at least one of the designated advertising content, the supplemental advertising content, and the recommended advertising content, the ranking order based at least in part on relevance to the item associated with the display advertisement; and populating the plurality of placements with a combination of the designated advertising content, the supplemental advertising content, and the recommended advertising content based at least in part on the ranking order, wherein the designated advertising content, the supplemental advertising content, and the recommended advertising content are displayed in conjunction on the single landing page.

2. The method of claim 1, wherein the supplemental advertising content is directed to at least one of one or more top selling items offered by the entity that sponsored the display advertisement and one or more items associated with a particular brand.

3. The method of claim 1, wherein the supplemental advertising content is directed to one or more items offered by the entity that complement the item promoted in the display advertisement.

4. The method of claim 1, wherein obtaining the recommended advertising content, comprises:
accessing an advertisement component data store comprising a plurality of advertising content and corresponding attributes that indicate the consumer segments to which the advertising content appeals; and
identifying advertising content having attributes that indicate the advertising content appeals to consumers of a consumer segment to which the user belongs.

5. The method of claim 1, further comprising:
determining user information associated with the user that interacted with the display advertisement; and personalizing a background for the advertisement template based on the user information.

6. A method of generating a personalized landing page, the method comprising:
under the control of one or more computer systems configured with executable instructions,
receiving, in response to a user interacting with a display advertisement, a request to provide a single landing page;
obtaining an advertisement template for a web page to generate the single landing page, the advertising template having one or more placements, each of the one or more placements is populated with content;
identifying an entity sponsoring the single landing page;
identifying content for display in the single landing page based on at least one of information about the request, information known about the entity sponsoring the single landing page, or information known about the user, wherein the content is at least one of the following: advertising, brand imagery, text and rich media;
determining a ranking order for the identified content for display, the ranking order based at least in part on relevance to an item associated with the display advertisement; and
saving to each of the one or more placements in the single landing page at least a portion of the identified content based at least in part on the ranking order, wherein the identified content comprises a first content portion identified based on the information about the request, a second content portion identified based on the information known about the entity sponsoring the single landing page, and a third content portion identified based on the information known about the user, the third content portion including information of interest to other users connected to the user via a third party social network, wherein the first content portion, the second content portion, and the third content portion are displayable in conjunction on the single landing page.

7. The method of claim 6, wherein identifying content for display in the landing page comprises:
identifying one or more consumer segments to which the user belongs, wherein each consumer segment is associated with at least one attribute common amongst all users that are associated with the consumer segment; and
identifying content having an attribute relevant to the at least one attribute associated with the identified consumer segment.

8. The method of claim 7, further comprising:
personalizing a background for the obtained advertisement template based on the information known about the user.

9. The method of claim 6, wherein the request to provide a landing page is associated with a display advertisement featuring an item, and wherein identifying content for display in the landing page, comprises:
identifying at least one attribute associated with the item featured in the display advertisement; and
identifying content relevant to the at least one identified attribute.

10. The method of claim 6, wherein the request to provide a landing page is associated with a display advertisement featuring an item that was targeted to the user based on a search query containing at least one token, and wherein identifying content for display in the landing page comprises:
receiving a referrer URL containing the at least one token;
parsing the referrer URL to obtain the at least one token; and identifying content relevant to the at least one token.

11. A method of generating a personalized landing page, the method comprising:
under the control of one or more computer systems configured with executable instructions,
receiving a request to provide a single landing page that contains advertisement content associated with an item that a user has shown an interest in, wherein the user interest is associated with the user interacting with a display advertisement featuring the item;
identifying an advertiser for sponsoring the single landing page;
obtaining information associated with the identified advertiser, the obtained information identifying other items that are provided by the advertiser and that the advertiser desires to show via the single landing page;
based on the obtained information associated with the identified advertiser,
obtaining advertising content associated with the item featured in the display advertisement to be presented in the single landing page; and
obtaining supplemental advertising content associated with the other items to be presented in the single landing page, at least a portion of the supplemental advertising content based on information known about the user, including information of interest to other users connected to the user via a third party social network;
obtaining a template for a web page to be used in generating the single landing page, the template having a plurality of placements, wherein each placement is populated with at least one advertisement;
determining a ranking order for at least one of the obtained advertising content and the obtained supplemental advertising content, the ranking order based at least in part on relevance to the item that a user has shown an interest in; and
providing the single landing page using at least the template, the plurality of placements in the template being populated using at least the obtained advertising content and the obtained supplemental advertising content based at least in part on the ranking order, wherein at least a portion of the obtained advertising content is different from at least a portion of the obtained supplemental advertising content, wherein the at least the portion of the obtained advertising content and the at least the portion of the obtained supplemental advertising content are displayable in conjunction on the single landing page.

12. The method of claim 11, wherein providing a personalized landing page, comprises:
saving to each of the plurality of placements one of the advertising content or the supplemental advertising content.

13. The method of claim 11, wherein the obtained supplemental advertising content is directed to one or more top selling items offered by the advertiser.

14. The method of claim 11, wherein the obtained supplemental advertising content is directed to one or more items offered by the advertiser on behalf of a single brand.

15. The method of claim 14, wherein the obtained supplemental advertising content is directed to one or more items offered by the single brand that are related to the item featured in the display advertisement.

16. The method of claim 11, wherein the obtained supplemental advertising content is directed to one or more items offered by the advertiser that are related to the item featured in the display advertisement.

17. The method of claim 16, wherein the obtained supplemental advertising content is based at least in part on the one or more consumer segments to which the user belongs.

18. A non-transitory computer-readable storage medium storing instructions that, when executed by at least one processor of a computing device, cause the computing device to:
receive a request to provide a single landing page, wherein at least a portion of the single landing page is associated with content for which a user has expressed interest;
obtain an advertisement template for a web page having one or more placements, wherein each placement is populated with at least one advertisement;
determine a ranking order for at least one of an advertising component related to the content for which the user has expressed interest, an advertising component designated by an advertiser, and an advertising component based on information known about the user, the ranking order based at least in part on relevance to the content for which the user has expressed interest; and
assign to the one or more placements at least one of the advertising component related to the content for which the user has expressed interest, the advertising component designated by an advertiser, and the advertising component based on information known about the user based at least in part on the ranking order, wherein at least a portion of the advertising component related to the content for which the user has expressed interest is different from at least a portion of the advertising component designated by the advertiser, and wherein at least a portion of the advertising component based on information known about the user is different from the at least the portion of the advertising component related to the content for which the user has expressed interest and the at least the portion of the advertising component designated by the advertiser, wherein the at least the portion of the advertising component related to the content for which the user has expressed interest, the at least the portion of the advertising component designated by the advertiser, and the at least the portion of the advertising component based on information known about the user are displayable in conjunction on the single landing page, the at least a portion of the advertising component based on information known about the user including information of interest to other users connected to the user via a third party social network.

19. The non-transitory computer-readable storage medium of claim 18, wherein the instructions when executed further cause the computing device to:
access user information associated with the user, the user information indicating one or more consumer segments to which the user belongs; and
identify advertising content having attributes that indicate the advertising content appeals to users of the one or more consumer segments to which the user belongs.

20. A system, comprising:
a processor; and
a memory device including instructions that, when executed by the processor, cause the processor to:
receive a request to provide a single landing page, wherein at least a portion of the single landing page is associated with content for which a user has expressed interest;
obtain an advertisement template for a web page, the advertising template having one or more placements, wherein each placement is populated with at least one advertisement;

determining a ranking order for at least one of an advertising component related to the content for which the user has expressed interest, an advertising component designated by an advertiser, or an advertising component based on information known about the user, the ranking order based at least in part on relevance to the content for which the user has expressed interest; and assign to the one or more placements at least one of the advertising component related to the content for which the user has expressed interest, the advertising component designated by an advertiser, and the advertising component based on information known about the user based at least in part on the ranking order, wherein at least a portion of the advertising component related to the content for which the user has expressed interest is different from at least a portion of the advertising component designated by the advertiser, and wherein at least a portion of the advertising component based on information known about the user is different from the at least the portion of the advertising component related to the content for which the user has expressed interest and the at least the portion of the advertising component designated by the advertiser, wherein the at least the portion of the advertising component related to the content for which the user has expressed interest, the at least the portion of the advertising component designated by the advertiser, and the at least the portion of the advertising component based on information known about the user are displayable in conjunction on the single landing page, the at least a portion of the advertising component based on information known about the user including information of interest to other users connected to the user via a third party social network.

21. The system of claim 20, wherein instructions further cause the processor to:

access user information associated with the user, the user information indicating one or more consumer segments to which the user belongs; and identify advertising content having attributes that indicate the advertising content appeals to users of the one or more consumer segments to which the user belongs.

\* \* \* \* \*